United States Patent [19]

Groebner

[11] 4,422,850

[45] Dec. 27, 1983

[54] EDUCATIONAL TOY AND CONTAINER

[76] Inventor: Bonnie J. Groebner, 18660 Yakmia St., Anoka, Minn. 55303

[21] Appl. No.: 268,860

[22] Filed: Jun. 1, 1981

[51] Int. Cl.³ ............................................. G09B 19/00
[52] U.S. Cl. ....................................... 434/98; 46/202; 434/259; 434/429
[58] Field of Search ................. 434/98, 258, 259, 247, 434/429; 46/201, 202; 211/68

[56] References Cited

U.S. PATENT DOCUMENTS

| | | | |
|---|---|---|---|
| 288,663 | 11/1883 | Reed | 46/201 |
| 1,507,662 | 9/1924 | Carley et al. | |
| 1,572,141 | 2/1926 | Hildebrandt et al. | |
| 1,700,274 | 1/1929 | Smye | 211/68 |
| 1,848,598 | 3/1932 | Barnes | |
| 1,932,368 | 10/1933 | Bowman | 46/37 |
| 2,180,653 | 11/1939 | Yancey et al. | 35/1 |
| 2,539,765 | 1/1951 | Wold | 434/259 X |
| 2,747,324 | 5/1956 | Zalkind | 46/17 |
| 3,474,563 | 10/1969 | Boster | 32/11 |
| 3,510,964 | 5/1970 | Dahners et al. | 35/22 |
| 3,592,472 | 7/1971 | Kent | 273/135 |
| 4,128,990 | 12/1978 | Phillips | 434/259 |

OTHER PUBLICATIONS

St. Anthony Messenger, Jan. 1981, p. 25.

Primary Examiner—William H. Grieb
Attorney, Agent, or Firm—Merchant & Gould

[57] ABSTRACT

An educational toy and container (10) having a base (13) and a plurality of walls (15) connected with the base (13) to define therewith an internal cavity (16). The walls (15) each have a top surface (22) having at least one hole (14). The area adjacent to each hole (14), is provided with a distinctive color. An insertable member (19) has a first end (25) and a second end (26). The insertable member (19) is also provided with a distinctive color. The holes (14) on the top surface (22) of the walls (15) are adapted to hold one of the ends (25 and 26) of the insertable member, whereby the insertable member may be inserted and removed from the holes (14). Means for moving the educational toy and container (10) along a floor are also provided. A lid member (24) is oppositely disposed from the base (13) and rests on the top surface (22) of the walls (15).

23 Claims, 10 Drawing Figures

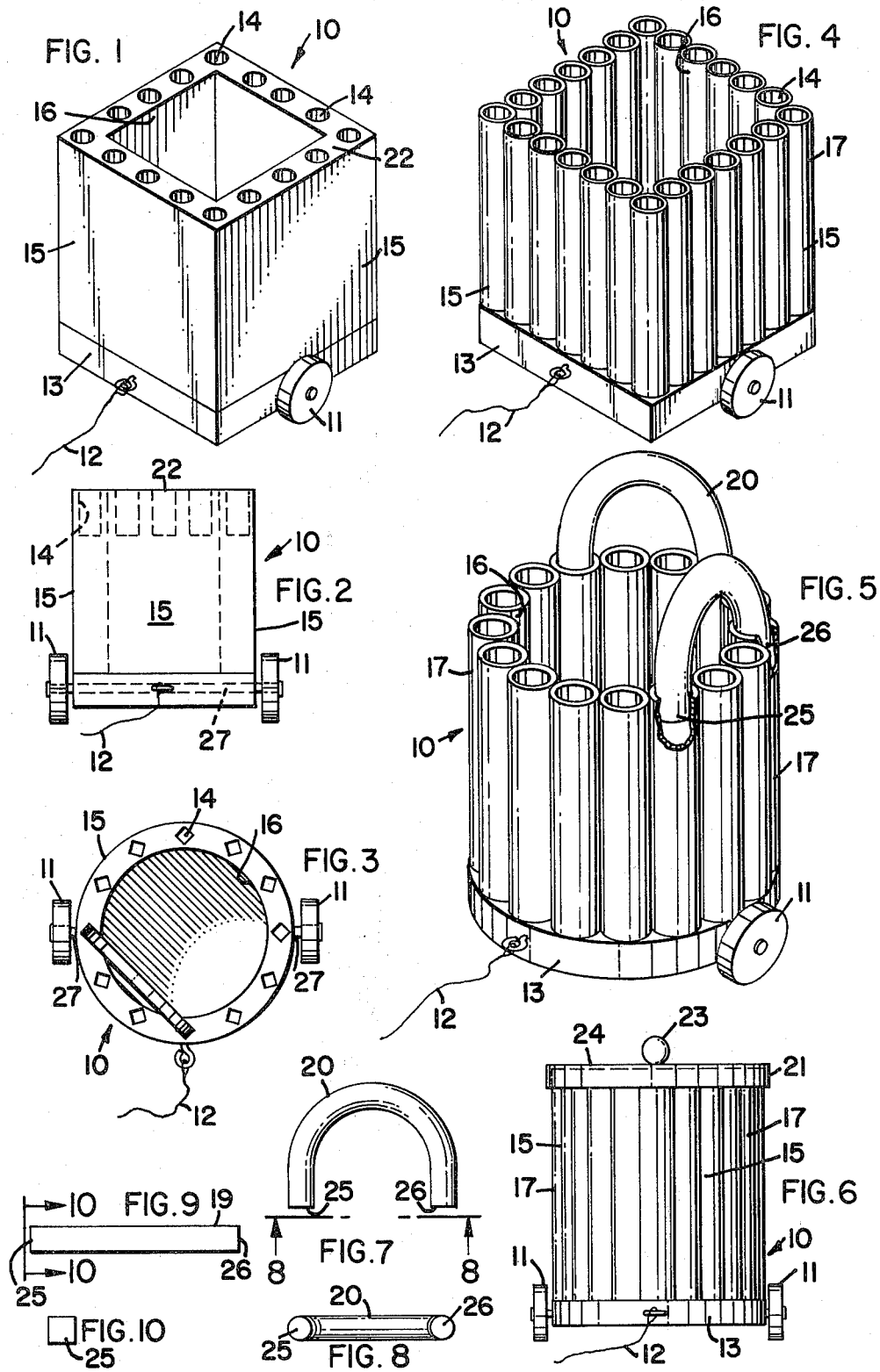

EDUCATIONAL TOY AND CONTAINER

BACKGROUND OF THE INVENTION

1. Field of the Invention

This invention relates generally to a toy container, and more particularly to an educational toy container.

2. Description of the Prior Art

There are numerous pull toys available today. A few examples would include pull toys having the general configuration of a car, boat, train or wagon, all with a string or rod attached to the toys, so that they may be pulled by a child.

There are also pull toys available, which in addition to being able to be pulled by a child, have an enclosed area so that other articles or toys may be stored within the pull toy. A wagon would be an example of such a pull toy. Another example would be a pull toy in the shape of a shoe. As with a wagon, toys may be stored within the shoe and pulled around by a child. Entrance to the shoe's enclosure is gained by unlacing a portion of the toy.

There are containers that have walls made from a plurality of rolls of paper. The paper, often newspaper, is tightly wound around an elongate object, such as a pencil. The rolls of paper are positioned vertically and connected to form the walls which define the internal cavity of the container. One end of a small pipe cleaner is securely fastened into the top of the roll in the hole left by the removal of the elogate object. The other end of the pipe cleaner is securely fastened to an adjacent roll, to give the effect of a weaved object. Small objects, such as pens or pencils, are stored in the internal cavity. When made on a larger scale, the container is used as a wastebasket.

Completely separate from the above-mentioned toys are educational toys that promote early learning by a child. Color identification is taught to children through a variety of devices. An example of such a device is a board having a number of apertures, together with a corresponding number of tight-fitting dowels adapted to be driven through the apertures. The apertures and dowels are of varying sizes. Typically, there are six rows of holes, with each row having a different diameter hole. The color is the same for all of the dowels that would fit into one row of holes, and correspond to the color surrouding each of the holes. Therefore, when the dowels are driven into the proper hole, the colors of the dowels and the area surrounding the hole match. Variations of this concept include a device having dowels of varying lengths and holes of varying depth. The dowel heads are of various colors, and the area around each hole is the same as the dowel whose length is the same as the dpeth of the hole. Therefore, to properly insert all of the dowels in the corresponding holes, all of the colors must match up.

There are also devices which, instead of inserting a dowel into a hole, have tethered dowels which are placed on top of a receptacle having matching colors. The tethering of the dowels prevents the loss of the dowels.

While the prior art devices discussed in the preceeding paragraphs are suitable for their particular function, they are limited to that particular function. If more than one function is desired, it is necessary to purchase more than one toy. This presents several disadvantages. The first disadvantage is that the cost of purchasing several toys is greater than the cost of purchasing one toy that combines numerous functions. The second disadvantage is that the larger number of toys requires more storage space in a child's room. Also, the great number of parts that is required by numerous toys contributes to the risk of loss of individual pieces of a toy. Loss of a portion of an educational toy, of course, reduces the effectiveness of the educational toy.

To date, there is no known single education toy which effectively combines the function of teaching color identification, finger coordination, grasping skills, and which incorporates these functions into a pull type container toy.

The present invention addresses the problems associated with the prior art devices and provides a new educational toy and container with an effective and surprising combination of functions.

SUMMARY OF THE INVENTION

The present invention is an education toy and container having a base and a plurality of walls cooperatively connected with the base to define therewith an internal cavity. The walls each have a top surface having at least one hole. The area adjacent to each hole is provided with a distinctive color. The educational toy and container also has an insertable member having first and second ends, the member also being provided with a distinctive color. The holes on the top surface of the walls are adapted to hold one of the ends of the insertable members, whereby the insertable member may be inserted and removed from the holes.

In different embodiments, the walls and base define an internal cavity having different cross-sections. The cross-sections defined include a circular, rectangular, triangular and oval cross-section.

The holes in the top surface of the walls have different cross-sectional areas in different embodiments. The cross-sectional areas include circular, triangular, oval and rectangular cross-sections.

The ends of the insertable member have a cross-section similar to the cross-section of the holes on the top surface of the walls. Thereby, the holes are adapted to hold one of the ends of the insertable member, whereby the insertable member may be inserted and removed from the holes. The first end of the insertable member is inserted into a hole having an area adjacent to it of the same color as the insertable member. The second end of the insertable member is similarly inserted into a hole having an area adjacent to the hole of the same color as the insertable member.

In a preferred embodiment of the invention, the walls comprise a plurality of cylindrical tubes, each tube having a distinctive color which is repeated at intermittent intervals. The tubes have an opening with a circular cross-section. The internal cavity also has a circular cross-section.

Also, means are provided for moving the educational toy and container along a floor. A pair of wheels attached to an axle is attached to the base. An elongate pulling member is attached to the base. Thereby, a child may pull the educational toy and container behind him as he is learning to walk or pushed in front of him to learn to balance.

An additional feature of the invention is a lid member oppositely disposed from the base and resting on the top surface of the walls. The lid member has a top surface and a rounded knob attached to the top surface.

The educational toy and container of this invention has the advantages of being movable, teaching color identification, teaching finger coordination, teaching balance, practicing new found walking abilities, and provides for a container to store the insertable members as well as other toys that may be left lying around the house. Further, when the insertable members are not being used to teach the child color identification, the insertable members may be used as a challenge to child imagination. Also children enjoy the insertable members at early teething stages.

BRIEF DESCRIPTION OF THE DRAWING

FIG. 1 is a view in perspective of the educational toy and container incorporating my present invention.

FIG 2 is a view in front elevation of the educational toy and container shown in FIG. 1.

FIG. 3 is a top plan view of another embodiment of the education toy and container incorporating my present invention.

FIG. 4 is a view in perspective of another embodiment of the educational toy and container incorporating my present invention.

FIG. 5 is a view in perspective of still another embodiment of the educational toy and container incorporating my present invention.

FIG. 6 is a view in front elevation of the educational toy and container shown in FIG. 5, including a lid member.

FIG. 7 is a view in front elevation of the U-shaped insertable member shown in FIG. 5.

FIG. 8 is a bottom plan view of the insertable member of FIG. 7, taken generally along the line 8—8.

FIG. 9 is a view in front elevation of another embodiment of the insertable member shown in FIG. 7.

FIG. 10 is a bottom plan view of the insertable member of FIG. 9 taken generally along the line 10—10.

DETAILED DESCRIPTION OF THE INVENTION

Referring to the Drawing, wherein like numerals represent like parts throughout the several views, an educational toy and container designated generally as 10 is shown in FIG. 1. The educational toy and container 10 has a base 13. A plurality of walls 15 are cooperatively connected with the base 13 to define therewith an internal cavity 16. The internal cavity 16, a shown in FIG. 1, has a rectangular cross-section. In another embodiment as shown in FIG. 3, the walls 15 define an internal cavity 16 having a circular cross-section. Although not shown, alternative embodiments have an internal cavity 16 with a triangular cross-section and an oval cross-section. The internal cavity 16, in still different embodiments, may have a variety of other shapes. The cross-section of the internal cavity 16 may be a polygon or any other closed surface.

The walls 15 each have a top surface 22 having at least one hole 14. The area adjacent to each hole 14 is provided with a distinctive color. The distinctive color is repeated at intermittent intervals around the top surface 22 of the walls 15. As seen in FIG. 1, the holes 14 have a circular cross-section. In another embodiment as seen in FIG. 3, the holes may have a square cross-section. Other embodiments, not shown, have holes with a triangular cross-section and an oval cross-section. Further, other embodiments may have holes with any polygonal cross-section or any closed surface cross-section.

In one embodiment, as seen in FIG. 4, the walls 15 comprise a plurality of cylindrical tubes 17. Each tube 17 has a distinctive color which is repeated at intermittent intervals. In the preferred embodiment, as shown in FIG. 5, the cylindrical tubes 17 are circular cylindrical tubes, the internal cavity 16 has a generally circular cross-section and base 13 is circular.

The base 13, wall 15 and cylindrical tubes 17 are rigid. Plastic is one material that may be used to make the base 13, walls 15 and cylindrical tubes 17. However, it is understood that other suitable materials may be used.

As shown in FIG. 9, insertable member 19 having a first end 25 and a second end 26 is provided. The insertable member 19 is provided with a distinctive color. Additional insertable members 19 are provided with different distinctive colors to match the variety of distinctive colors of the areas adjacent to each hole 14. The holes 24 are adapted to hold one of the ends 25 and 26 of the insertable member 19, whereby the insertable member 19 may be inserted and removed from the holes 14. In one embodiment the insertable member 19 may be substantially straight, as shown in FIG. 9, or as shown in FIG. 7, in another embodiment the insertable member 20 is generally U-shaped and is flexible.

In one embodiment, as shown in FIG. 10, the cross-section of the insertable member 19 is square. In the preferred embodiment, as shown in FIG. 8, the insertable member 20 has a circular cross-section. In alternative embodiments, not shown, the insertable member 19 has a triangular cross-section and an oval cross-section. In still other embodiments, not shown, the insertable member 19 may have any polygonal cross-section, with a character head or shape, such as a dog or a person. Since the holes 14 are adapted to receive the first end 25 and second end 26 of the insertable member 19, it is preferred that the cross-section of the hole 14 and the cross-section of the insertable member 19 be similar. When the holes 14 are not circular, it is preferred that the holes 14 be aligned so that both ends 25 and 26 of the insertable member 19 may be inserted into the holes 14 without twisting. As seen in FIG. 3, the sides of every third hole 14 are parallel. After the first end 25 is inserted into a hole 14, the second end 26 can be inserted into a hole 14, by just bending and not twisting the insertable member 19. As shown in FIG. 2, the hole 14 need not extend through the entire length of the wall 15. However, in a preferred embodiment, the hole 14 extends through the entire length of the cylindrical tube 17. If the insertable member is used with a character shape, the insertable member need not interlock every other hole, but may be placed only in one hole, not extending through the entire length of the wall. However, the insertable member remains flexible for teething, grasping, bending and overall development of motor skill.

The educational toy and container 19 has means for moving the toy along a floor. In one embodiment, the moving means comprises two or more wheels 11 attached to the base 13 and an elongate pulling member 12 attached to the base 13. It is preferred that the elongate pulling member 12 is a flexible strand 12 as shown in FIG. 1. A pair of wheels 11 may be connected to each other by an axle 27, which is connected to the base 13 or the wheels 11 may be separately attached to the base 13.

As shown in FIG. 6, the educational toy and container 10 has a removable lid member 21 oppositely disposed from the base 13 and resting on the top surface 22 of the walls 15. Alternately, the top surface 22 may have a plurality of blocks (not shown) attached, so that the lid member 21 rests on top of the blocks, and still covers the internal cavity 16. The lid member 21 has a top surface 25 and means for removal, such as a rounded knob 23 attached to the top surface 24.

Color identification is taught to a child by having the child insert the first end 25 of the insertable member 19 into the hole 14 that has an area adjacent to it the same color as the insertable member 19. The second end 26 of the insertable member 19 is then inserted into another hole 14 with an area adjacent to it the same color as the insertable member 19. The first end 25 and second end 26 may then be removed from the holes 14. FIG. 5 shows two insertable members 20 inserted in holes 14. The insertion and removal of the insertable member 19 helps the child develop better finger coordination. The educational toy and container 10 may be pulled along the floor by the child or pushed in front of him to learn to balance. The child may then pick up various toys that may by lying on the floor and place them into the internal cavity 16. When not in use, the insertable member 19 may also be placed in the internal cavity 16. The insertable member 19 in one embodiment, is a soft flexible plastic member. When the insertable member 91 is not being inserted or removed from the holes 14, the insertable member 19 may be used as a challenge to child imagination. Also, children enjoy the insertable member at early teething stages. The child may improve its grasping skills by grasping the rounded knob 23 and placing the lid member 21 on the top surface 22. After doing so, the child may sit on the top surface 24 of the lid member 21 and use the educational toy and container 10 as a seat.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

What is claimed is:

1. A combination educational toy and container comprising:
   (a) a base;
   (b) a plurality of cylindrical tubes defining a closed surface and cooperatively connected with said base for defining therewith an internal cavity of generally circular cross-section;
   (c) said plurality of cylindrical tubes having a top surface having at least one hole formed therein;
   (d) an insertable member having first and second ends; and
   (e) said hole being adapted to hold said first end of said insertable member, whereby said first end of said insertable member may be inserted and removed from said hole.

2. The combination educational toy and container of claim 1, further comprising a removable lid member oppositely disposed from said base and resting on said top surface of said plurality of cylindrical tubes, and means for removal attached to said lid.

3. The combination educational toy and container of claim 1, wherein said insertable member is generally U-shaped.

4. The combination educational toy and container of claim 1, wherein said insertable member is a soft flexible member, whereby said insertable member may be used as a teething ring by a child.

5. The combination educational toy and container of claim 1, wherein said wall means has an area adjacent to said hole provided with a distinctive color and wherein said insertable member is of a corresponding distinctive color.

6. The combination educational toy and container of claim 1, wherein said second end of said insertable member has a shape of a character.

7. A combination educational toy and container comprising:
   (a) a base;
   (b) a plurality of cylindrical tubes defining a closed surface and cooperatively connected with said base for defining therewith an internal cavity of generally rectangular cross-section;
   (c) said plurality of cylindrical tubes having a top surface having at least one hole formed therein;
   (d) an insertable member having first and second ends; and
   (e) said hole being adapted to hold said first end of said insertable member, whereby said first end of said insertable member may be inserted and removed from said hole.

8. The combination educational toy and container of claim 7, further comprising a removable lid member oppositely disposed from said base and resting on said top surface of said plurality of cylindrical tubes, and means for removal attached to said lid.

9. The combination educational toy and container of claim 7, wherein said insertable member is generally U-shaped.

10. The combination educational toy and container of claim 7, wherein said insertable member is a soft flexible member, whereby said insertable member may be used as a teething ring by a child.

11. The combination educational toy and container of claim 7, wherein said wall means has an area adjacent to said hole provided with a distinctive color and wherein said insertable member is of a corresponding distinctive color.

12. The combination educational toy and container of claim 7, wherein said second end of said insertable member has a shape of a character.

13. A combination educational toy and container comprising:
   (a) a base;
   (b) a plurality of cylindrical tubes defining a closed surface and cooperatively connected with said base for defining therewith an internal cavity of generally oval cross-section;
   (c) said plurality of cylindrical tubes having a top surface having at least one hole formed therein;
   (d) an insertable member having first and second ends; and
   (e) said hole being adapted to hold said first end of said insertable member, whereby said first end of said insertable member may be inserted and removed from said hole.

14. The combination educational toy and container of claim 13, further comprising a removable lid member oppositely disposed from said base and resting on said top surface of said plurality of cylindrical tubes, and means for removal attached to said lid.

15. The combination educational toy and container of claim 13, wherein said insertable member is generally U-shaped.

16. The combination educational toy and container of claim 13, wherein said insertable member is a soft flexible member, whereby said insertable member may be used as a teething ring by a child.

17. The combination educational toy and container of claim 13, wherein said wall means has an area adjacent to said hole provided with a distinctive color and wherein said insertable member is of a corresponding distinctive color.

18. The combination educational toy and container of claim 13, wherein said second end of said insertable member has a shape of a character.

19. A combination educational toy and container comprising:
   (a) a base;
   (b) a plurality of tubes cooperatively connected with said base to define therewith a closed surface internal cavity;
   (c) a pair of wheels attached to said base;
   (d) an elongate pulling member attached to the educational toy and container;
   (e) a lid member oppositely disposed from said base and resting on said tubes to define a closed cavity for the storage of toys; and
   (f) said lid member having a top surface and means for removal attached to said lid.

20. The combination educational toy and container of claim 19, wherein said plurality of tubes define a generally circular internal cavity.

21. The combination educational toy and container of claim 19, wherein said plurality of tubes define an internal cavity with a polygonal cross-section.

22. The combination educational toy and container of claim 19, wherein said tubes are cylindrical tubes.

23. A combination educational toy and container comprising:
   (a) a base;
   (b) a plurality of cylindrical tubes, having top and bottom ends, defining a closed surface and said bottom end connected to said base for defining therewith a generally cylindrical internal cavity, said top end of each of said tubes having a distinctive color, said color being repeated at intermittent intervals by said top ends;
   (c) a U-shaped insertable member having first and second end, said insertable member being provided with a distinctive color;
   (d) said insertable member having a circular cross-section;
   (e) said top end being adapted to hold one of said first end or second end of said insertable member, whereby said ends of said insertable member may be inserted and removed from said top end having the same distinctive color;
   (f) a pair of wheels attached to said base;
   (g) a insertable strand attached to the educational toy and container; and
   (h) a lid member oppositely disposed from said base and resting on said top end of said cylindrical tube, and means for removal attached to said lid.

* * * * *

UNITED STATES PATENT AND TRADEMARK OFFICE
CERTIFICATE OF CORRECTION

PATENT NO. : 4,422,850

DATED : December 27, 1983

INVENTOR(S) : Bonnie J. Groebner

It is certified that error appears in the above-identified patent and that said Letters Patent are hereby corrected as shown below:

Column 1, line 47, for "surrouding" read --surrounding--.
Column 1, line 54, for "dpeth" read --depth--.
Column 4, line 57, for "19" read --10--.
Column 5, line 5, for "25" read --24--.
Column 5, line 25, for "91" read --19--.

Signed and Sealed this

Tenth Day of July 1984

[SEAL]

Attest:

Attesting Officer

GERALD J. MOSSINGHOFF

Commissioner of Patents and Trademarks